Oct. 3, 1950

J. BARDEEN

THREE-ELECTRODE CIRCUIT ELEMENT UTILIZING SEMICONDUCTIVE MATERIALS

Filed Feb. 26, 1948

2,524,033

INVENTOR
J. BARDEEN
BY
Harry C. Hart
ATTORNEY

Patented Oct. 3, 1950 2,524,033

UNITED STATES PATENT OFFICE 2,524,033

THREE-ELECTRODE CIRCUIT ELEMENT UTILIZING SEMICONDUCTIVE MATERIALS

John Bardeen, Summit, N. J., assignor to Bell Telephone Laboratories, Incorporated, New York, N. Y., a corporation of New York Application February 26, 1948, Serial No. 11,166

19 Claims. (Cl. 179—171)

This invention relates to electric circuit elements utilizing semiconductor materials, to methods of operating them and to circuits embodying them.

The principal object of the invention is to provide a compact, simple, rugged and efficient amplifier for electric signals.

Another object is to provide an amplifier which does not require a heated thermionic cathode for its operation, and which is therefore in condition for operation immediately it is turned on. A related object is to provide an amplifier which requires no evacuated or gas-filled envelope.

Attempts have been made in the past to construct amplifiers of solid rectifiers utilizing selenium, copper sulphide or other similar semiconductor materials by the direct expedient of embedding a grid-like electrode in the dielectric layer disposed between the cathode and the anode of the rectifier. The grid is supposed, by exerting an electric force at the surface of the cathode, to modify its emission and so alter the cathode-anode current. As a practical matter it is impossible to embed a grid in a layer which is so thick as to insulate the grid from the other electrodes and yet so thin as to permit current to flow between them. It has also been proposed to pass a current from end to end of a strip of homogeneous semiconductive material, and by the application of a strong transverse electric field to control the resistance of the strip, and hence the current through it.

So far as is known, all of such past devices are beyond human skill to fabricate with the fineness necessary to produce amplification. In any event they do not appear to have been commercially successful.

In contradistinction to these prior devices, the present invention, in a preferred embodiment, utilizes a block of semiconductive material of which the main body is of one conductivity type while a very thin surface layer or film, separated from the body by a high resistance barrier, is of opposite conductivity type. The high resistance of the barrier is preferably accentuated by appropriate choice of the electrode bias potentials. A first electrode, whose dimensions are small compared with the surface of the block, yet large compared with the layer thickness and is preferably a point, and which is denoted the source electrode, makes contact with this layer. A second electrode makes contact with a substantial area of the block, for example, the full area of the face opposite to that which bears the layer. It is denoted the collector. An external work circuit including a potential source and a load impedance interconnects these electrodes. By reason of the electrode geometry, the high resistance of the barrier and the much lower lateral resistance of the surface layer, the current, in making its way through the block from the source electrode to the collector, first spreads out laterally in the surface layer in all directions from the source electrode before crossing the barrier. The region immediately surrounding the source electrode is therefore a region of relatively high current density, and the resistance of this part of the block to the spreading current is a major part of the whole internal resistance of the device. This condition is accentuated by holding the resistance of the actual contact of the source electrode with the surface layer to a relatively small value, namely, by making the contact area large compared with the layer thickness.

In accordance with the invention in one of its aspects, a third electrode, denoted the control electrode, is disposed to exert its influence on this spreading resistance. Preferably, it surrounds the source electrode, being insulated from it. It is placed very close to the surface layer, either spaced from it by a thin insulating film, or making high resistance rectifier contact with it. As in the case of the work circuit the resistance of such rectifier contact may be accentuated by proper choice of the bias potential of the control electrode. In one embodiment this control electrode is an electrolyte. In each case its effect is to exert at the surface layer of the semiconductor an electric field of such strength as to overcome the shielding effect of any surface charges which may be present and establish a field in the interior which locally modifies the density of current carriers and so the spreading resistance of the device. The result is a substantial modification of a substantial part of the whole internal resistance of the device, and so a substantial alteration of the current in the external work circuit. At the same time, the current drawn by the control electrode is of almost negligible magnitude, namely, one microampere or less, while the current variations in the external circuit are several hundred microamperes in magnitude. Therefore the device operates as a current amplifier.

While best results are believed to be obtainable with a block of semiconductor material of which the main body is of one conductivity type, while a thin surface layer, separated from the main body by a high resistance barrier, is of opposite conductivity type, the invention is equally applicable to a thin surface layer or film of semiconductive material mounted on a supporting base of insulating material, in which case the collector electrode itself may be a metal ring, making a low resistance contact with the semiconductive layer at a substantial distance from the source electrode, i. e., more distant from the source electrode than is the control electrode. If preferred, the semiconductor layer may be mounted on a supporting base of conductive material such as a metal, in which case the metal base itself may constitute the extended collector terminal. In this event the semiconductor layer should make a high resistance contact of the rectifier type with the base.

It is a feature of the invention that the input and output impedances of the device are controlled by choice and treatment of the semiconductor material body, of its surface layer and of the barrier between them as well as by the choice of the bias potentials on the electrodes.

The invention will be fully apprehended from the following detailed description of preferred embodiments thereof, taken in connection with the appended drawings in which.

Figure 1:
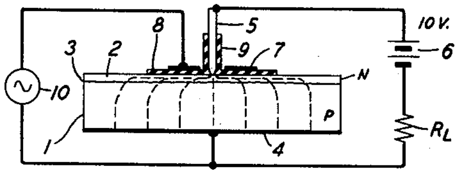
Fig. 1 is a schematic diagram showing one embodiment of the invention and illustrating some of the principles on which the invention is based.

The materials with which the invention deals are those semiconductors whose electrical characteristics are largely dependent on the inclusion therein of very small amounts of significant impurities. The expression "significant impurities" is here used to denote those impurities which affect the electrical characteristics of the material such as its resistivity, photosensitivity, rectification, and the like as distinguished from other impurities which have no apparent effect on these characteristics. The term "impurities" is intended to include intentionally added constituents as well as any that may be contained in the basic material as found in nature or as commercially available. Silicon is such a material which, along with some representative impurities will furnish an illustrative example for explanation of the present invention. Germanium is another such material.

In the case of semiconductors which are chemical compounds such as cuprous oxide ($Cu_2O$) or silicon carbide (SiC) deviations from stoichiometric composition may constitute significant impurities.

Small amounts, namely, up to 0.1 per cent of impurities generally of higher valency than the basic semiconductor material, e. g., phosphorous in silicon, antimony and arsenic in germanium, are termed "donor" impurities because they contribute to the conductivity of the basic material by donating electrons to an unfilled "conduction" energy band in the basic material. In such case the donated negative electrons constitute the carriers of current and the material and its conductivity are said to be of the excess or N-type. Similar small amounts of impurities which are of lower valency than the basic material, e. g., boron in silicon or aluminum in germanium, are termed "acceptor" impurities because they contribute to the conductivity by "accepting" electrons from the atoms of the basic material in the band of filled energy levels. Such an acceptance leaves a gap or "hole" in the filled band. By interchange of the borrowed electrons from atom to atom, these positive "holes" effectively move about and constitute carriers of current and the material and its conductivity are said to be of the defect or P-type.

It is known how to fabricate a block of silicon of which the main body is of one of these types, while a thin surface layer, separated from the main body by a high resistance barrier, is of the other type. The most familiar case is that in which the main body of the silicon block is of the P-type while the surface layer is of the N-type. For methods of preparing such silicon, as well as for certain uses of the same, reference may be made to an application of J. H. Scaff and H. C. Theuerer, filed December 24, 1947, Serial No. 793,744, and to United States Patents 2,402,661 and 2,402,662 to R. S. Ohl. Such materials are known to be suitable for use in connection with the present invention. Furthermore, in an application of R. B. Gibney filed February 26, 1948, Serial No. 11,167, there is described a process in which an etched surface of a block of N-type germanium is covered with a viscous electrolyte in which germanium and its oxide are insoluble, and an electric potential difference is applied to the germanium-electrolyte interface, the negative terminal of the source being connected to the electrolyte, whereupon a current flows. The applied potential difference is increased to compensate for the increasing resistance of the interface over a period of a half hour or so. The process results in the formation of a superficial layer of germanium oxide on the block with a layer of P-type germanium below it, separated from the N-type body of the block by a high resistance barrier. The oxide layer is then washed off, leaving the P-type layer intact and exposed. This process takes advantage of the high back voltage characteristics of N-type germanium as prepared in accordance with the treatment which forms the subject-matter of an application of J. H. Scaff and H. C. Theuerer, filed December 29, 1945, Serial No. 638,351, and which is further described in a "Final Report on Preparation of High Back Voltage Germanium Rectifiers" by J. H. Scaff and H. C. Theuerer, published by Bell Telephone Laboratories, Incorporated, on October 24, 1945, under the terms of O. S. R. D. Contract OEM*sr*-1408, and identified as Report No. 555. These two examples are of course not exclusive, the invention in certain of its aspects being applicable to any arrangement of a thin layer of semiconductor material of one or other of the two known conductivity types.

In accordance with the invention in one of its preferred forms, a block of such semiconductor material comprising a main body of one type, a surface layer of the opposite type and a barrier layer between, is provided with a point electrode making contact with the surface layer, a plate electrode making a low resistance contact with the main body and a control electrode surrounding the point electrode and insulated therefrom and also from the surface layer. By way of a specific example and referring to Figs. 1 and 2, Fig. 2 being an enlarged sectional view of a part of Fig. 1, there is provided a block 1 of silicon material of which the main body is of P-type while a surface layer 2 of the order of $10^{-4}$ cm. in thickness, separated from the body by a barrier 3, is of the N-type. The face of the block 1 which is opposite to the layer 2 is provided with a conducting metal film 4, by evaporation or otherwise. A source electrode 5, of dimensions which are small as compared with the area of the surface layer 2, for example a sharp metal point, makes contact with the surface layer 2 of the silicon block, somewhere near its center, or at least several point contact diameters removed from the nearest edge. The point contact may consist of a wire of tungsten or other tough material which has been sharpened electrolytically or by grinding. Processes for forming and sharpening such point electrodes are described in United States Patent 2,430,028 to W. G. Pfann, J. H. Scaff, and A. H. White.

An electric circuit is completed from the point electrode 5 by way of a potential source such as a battery 6 and a load impedance, for example a resistor $R_L$, to the metal film 4 and so to the main body of the block 1, the polarity of the battery 6 being such that the point electrode is positive with respect to the N-type layer. This operates to bias the junction of the block 1 with the electrode 5, regarded as a rectifier, in its reverse direction. In close proximity both to the N-type layer 2 and to the source electrode 5 and insulated from each of them, there is provided a third electrode which serves as a control electrode. This electrode may comprise a circular film or plate 7 of metal of small diameter and having a central hole pierced through it of diameter somewhat greater than that of the source electrode 5. It is insulated from the semiconductive layer by a film 8 of insulating material such as polystyrene which is as thin as conveniently may be. The source electrode 5 is insulated from the control electrode in any convenient manner, for example, by a coating 9 of wax. A signal to be translated is applied to the control electrode 7, for example, by connecting its source 10 between the control electrode 7 and the plate electrode 4.

Figure 2:
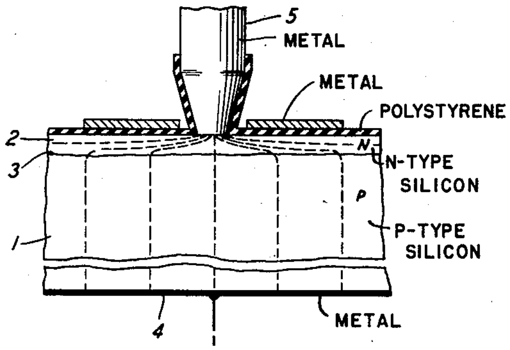
Fig. 2 is a cross-section of a part of Fig. 1 to a greatly enlarged scale.

In part because of the geometry of the arrangement of Fig. 1 and in part because of the high resistance of the barrier 3 and the much lower lateral resistance of the N-type layer 2, current entering the N-type layer from the source electrode 5 first spreads laterally for substantial distances before turning to cross the high resistance barrier 3. Because of the very small thickness of the insulating film 8 between the control electrode 7 and the semiconductive layer 2, a voltage applied to the control electrode 7 produces a strong electric field across the insulating film 8 and at the surface of the semiconductive layer 2. This field is of a strength sufficient to overcome the shielding effect of surface charges induced on the surface of the semiconductive layer 2 and therefore to reach the interior of the layer itself and produce a volume or space charge and so modify the conductivity of this part of the layer. Since this part of the N-type layer carries substantially all of the current from the source electrode 5 in a very small region, its current density is high and the spreading resistance corresponding to this part of the current path constitutes a substantial fraction of the resistance of the whole block between the source electrode 5, and the plate electrode or collector 4. Therefore, modification of the current density by the space charge induced in this region by application of a signal voltage to the control electrode 7 results in the modification of the current through the block as whole and therefore a modification of the voltage across the load resistor $R_L$.

Figure 3:
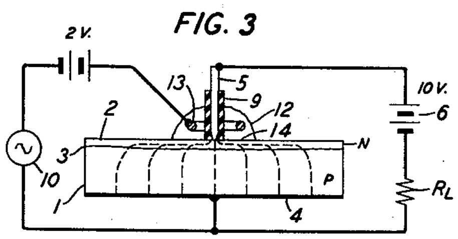
Fig. 3 is a schematic diagram similar to Fig. 1 but showing a modified electrode structure.

Fig. 3 shows a modification of Fig. 1 by which a still greater control action or current amplification is secured. In this modification the semiconductive block, the surface layer 2, the source electrode 5 and the plate collector 4 may be the same as in Fig. 1. Instead of a metal ring electrode for the control, an electrolyte 12 lies on the N-type layer 2 and in contact with it. It may, indeed surround the source electrode 5. The electrolyte 12 is insulated from the source electrode 5 by a wax coating 9 on the latter. Signal voltage is applied to the electrolyte 12 by making electrical contact with it by way of a ring or plate such as the plate 7 of Fig. 1, or by a loop 13 of wire, or in any other convenient way. With this arrangement no special film of dielectric material need be applied to the semiconductive layer 2 because sufficient isolation between the electrolyte and the semiconductive layer is secured in either of two ways. With an electrolyte such as water or, indeed, with any electrolyte when unbiased or biased positively, ions migrate toward the interface 14 and collect very close to it; but with a small voltage difference of a volt or so, only a small fraction of these ions are discharged, and the result is a strong field at the semiconductor surface. With an electrolyte such as glycol boriborate, when a negative bias with respect to the surface of the layer 2 and of sufficient magnitude is applied to it, electrolytic action takes place, which may be in the nature of oxidation. Measurement indicates that an extremely thin, extremely strong dielectric film which may be an oxide of the semiconductor material, for example, silicon dioxide, is formed over the area of contact 14 between the surface of the N-type layer 2 and the surface of the electrolyte 12. With this arrangement and as long as the bias on the electrolyte remains of negative sign, a given signal voltage results in the application at the surface of the N-type layer 2 of a field which is still stronger than that secured with the arrangement of Fig. 1 and therefore of a greater modification of the conductivity of this portion of the N-type layer. With this arrangement, however, the relaxation time of the electrolyte itself imposes an upper limit to the frequency of operation. To keep this upper limit as high as possible, the thickness of the electrolyte between the semiconductor layer 2 and the supply conductor 13 is kept as small as possible.

Such use of an electrolyte as a control electrode forms the subject-matter of an application of W. H. Brattain and R. B. Gibney, Serial No. 11,168, filed February 26, 1948.

Figure 4:
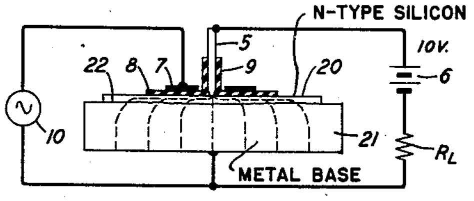
Fig. 4 shows a further modification in which a film or layer of semiconductive material is mounted on a metal base.

Fig. 4 shows another alternative in which a layer 20 of semiconductive material of P-type or of N-type is applied to a conductive block 21 as a support. The large area contact 22 between the layer 20 of semiconductor material and the conducting base 21 should be a rectifier junction, and pyrolytic deposition, for example, of silicon or germanium onto a metal surface produces this type of contact. For the rest, the electrode arrangement is shown as being identical with that of Fig. 1, but may, if preferred be as shown in Fig. 3. To encourage spreading of the current from the point contact electrode in the semiconductive layer, the rectifier junction 22 should be operated in its high resistance condition, i. e., with the semiconductor layer 20 positive with respect to the metal base 21 if of N-type as shown and negative if of the P-type.

Figure 5:
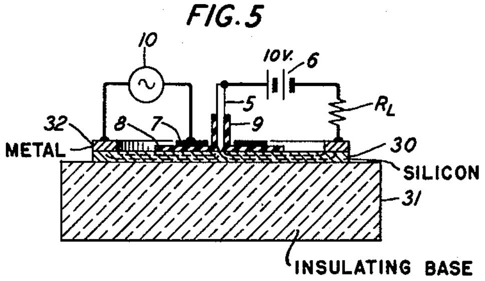
Fig. 5 is a further modification in which a film or layer of semiconductive materials is mounted on an insulating base, the electrode arrangement being appropriately modified.

Fig. 5 shows still another modification of the invention in which a layer 30 of semiconductor material, P-type or N-type as preferred, is supported on a block 31 of insulating material. The source electrode 5 and the control electrode 7 are shown as being identical with those of Fig. 1 while the control electrode may, if preferred, be as shown in Fig. 3. The collector electrode, however, differs from those of Figs. 1 and 3 because of the insulating character of the support 31. Instead, a metal ring 32, of diameter which is large as compared with the diameter of the control electrode 7, makes contact with the semiconductor layer 30 in a fashion to surround the source electrode 5 and collects all the current which enters the layer 30 from the source electrode 5. With this geometrical arrangement, the spreading resistance of the portion of the layer in the immediate vicinity of the source electrode 5 is accentuated in the same manner as by the barrier 3 of Fig. 1 and perhaps even more so. If desired, the control electrode may be placed on the opposite face of the semiconductor layer 30, directly below the source electrode 5.

Figure 6:
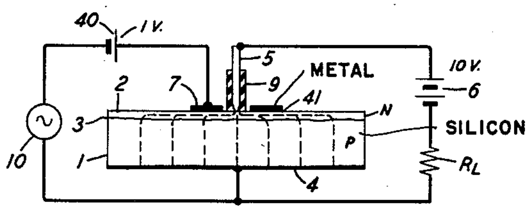
Fig. 6 shows a further modification in which a control signal is applied by way of a rectifier contact between a semiconductor material and a metal; and, Fig. 7 shows a further modification in which a control signal is applied by way of a rectifier contact between two semiconductors of different types.

Fig. 6 shows a further alternative which differs from Fig. 1 by the omission of the film 8 of insulation which in Fig. 1 separates the control electrode 7 from the semiconductor layer 2. Instead, the control electrode 7, which is of metal, makes rectifier contact with the semiconductor layer 2, and a bias is applied, as by a battery 40 in such sense that this metal-to-semiconductor junction 41 is operated in the reverse direction in the rectifier sense of the word. Thus with an N-type layer 2, the control electrode 7 should be biased negatively with respect to the layer 2. When the load $R_L$ is matched to the unit, one half of the voltage of the battery 6 appears across the load and one half across the unit. The greater part of the latter voltage appears across the spreading resistance in the immediate vicinity of the source electrode 5, so that the average potential of that part of the surface layer with which the electrode 7 makes contact is about 2 or 3 volts. Therefore a positively poled battery of 1 or 2 volts, connected in the manner shown, provides the desired negative bias of a volt or two with respect to the layer. With this construction the magnitude of the impedance at the junction 41 is such that the current which flows is not seriously objectionable. At the same time the proximity between the semiconductor layer 2 and the control electrode 7 is increased by removal of the insulating film 8 of Fig. 1. As a result, a given change in the voltage between the body of the block 1 and the control electrode 7 produces a greater change in the electric field at the surface of the layer 2 and so a greater change in the spreading resistance within the layer and in the current in the external load resistance $R_L$.

Figure 7:
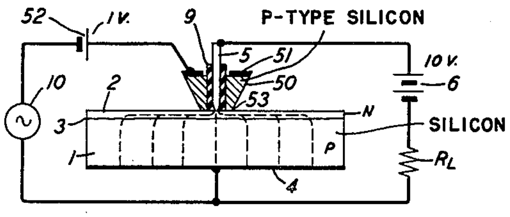

Still another modification is shown in Fig. 7 which is the same as Fig. 6 except for the substitution of a ring-shaped control electrode 50 of semiconductive material for the metal ring 7 of Fig. 6. The material of the ring 50 should be of opposite conductivity type to that of the surface layer 2. Electric connection may be made to it by way of a metal film 51 plated on its upper face and forming an ohmic contact therewith, or otherwise. It is biased, as by a battery 52, in such a sense that the junction 53 between it and the surface layer 2 operates in the reverse direction. For example, if the main body of the block 1 is of P-type with a surface layer 2 of N-type material as shown, the control ring 50 should be of P-type and should be biased negatively with respect to the layer 2. As in the case of Fig. 6, the negative bias with respect to that portion of the layer with which the control electrode 50 makes contact may be secured by connection of a battery 52 of a volt or so poled and connected in the manner shown. Best values of the bias may be found by trial. In this connection the chemical constitution of the control ring 50 is not important. It may be of the same material, chemically, as the surface layer 2 or different, as desired. The use of a control electrode of semiconductor material and of opposite conductivity type to that of the layer with which it makes contact results in a substantial increase in the resistance of the junction 53 as compared with the metal-to-semiconductor junction of Fig. 6.

As shown in the figure, the semiconductive control electrode 50 may have the form of a truncated cone having a cylindrical bore therethrough to receive the source electrode 5, its smaller face bearing on and making rectifier contact with the layer 2, the film 51 being plated on its larger face to provide a low resistance connection. With this construction, the voltage drop between the signal source 10 and the control electrode 50, and in the body of the control electrode 50 itself is minimized, the major fraction of such voltage appearing across the rectifier junction 53.

In the figures, the semiconductive surface layer is shown as being of N-type and the main body of the block as being of P-type. The polarities of the bias sources shown are chosen to suit this arrangement. It is to be understood that if a surface layer of N-type be employed, on a supporting base which, if of semiconductive material, is of P-type, the polarities of the bias sources are to be reversed.

Various combinations of the several electrode arrangements with the several semiconductor material arrangements shown will occur to those skilled in the art.

What is claimed is:

1. A circuit element which comprises a conductive supporting body, a thin surface layer of semiconductive material supported by said body, differing in conductivity type therefrom and separated therefrom by a high resistance but conductive barrier, a current input electrode making point contact with said surface layer, said barrier serving to constrain current introduced into said layer by way of said input electrode to flow principally in lateral directions in said layer in the vicinity of said input electrode, a second electrode making low resistance contact with said body and disposed to collect current entering said layer from said point contact electrode, and a third electrode juxtaposed with said layer to produce, when supplied with control energy, an electric field at the layer surface and in the vicinity of said point electrode.

2. Apparatus as defined in claim 1 wherein the supporting body is a block of semiconductor material.

3. Apparatus as defined in claim 1 wherein the supporting body is a block of semiconductor material of one conductivity characteristic and in which the thin surface layer is of the same material but of opposite conductivity characteristic, said two characteristics being N-type and P-type, respectively.

4. Apparatus as defined in claim 1 wherein the supporting body is a block of silicon of one conductivity characteristic and in which the thin surface layer is silicon of opposite conductivity characteristic, said two characteristics being N-type and P-type, respectively.

5. Apparatus as defined in claim 1, wherein the supporting body is a metal block, the large area contact between the metal block and the semiconductor layer being a high resistance rectifier contact.

6. Apparatus as defined in claim 1, wherein the supporting body is a metal block, the large area contact between the metal block and the semiconductor layer being a high resistance rectifier contact, and wherein biasing means are provided to cause the high resistance rectifier contact between the metal block and the semiconductor layer to be operated in its reverse direction.

7. Apparatus as defined in claim 1, wherein the third electrode is a circular ring of conductive material surrounding the first electrode and separated from the semiconductive layer by a film of insulation.

8. Apparatus as defined in claim 1, wherein the third electrode is a circular ring of metal surrounding the first electrode and separated from the semiconductor layer by a film of insulation.

9. Apparatus as defined in claim 1 wherein the third electrode is a metal electrode and is in electrical contact with the layer, and biasing means to cause the contact between said third electrode and said layer to be a high resistance rectifier contact.

10. Apparatus as defined in claim 1 wherein the third electrode is in electrical contact with the layer and is of semiconductive material of opposite conductivity type from the semiconductive layer, and biasing means to cause the contact between said third electrode and said layer to be a high resistance rectifier contact.

11. Apparatus as defined in claim 1 wherein the third electrode is of semiconductive material of opposite conductivity type from the semiconductive layer, and wherein said electrode is a block having a smaller face and a larger face, said smaller face bearing on said layer, a metal film making low resistance contact with said larger face, and biasing means to cause the contact between the smaller face and said layer to be a high resistance rectifier contact.

12. Apparatus as defined in claim 1, wherein the third electrode comprises an electrolyte.

13. Apparatus as defined in claim 1, wherein the third electrode comprises a drop of electrolyte surrounding and insulated from the point electrode.

14. An amplifier which comprises a block of semiconductive material of which the main body is of one conductivity type, a surface layer of material of opposite conductivity type supported thereon and separated therefrom by a high resistance barrier, a point electrode in contact with said surface layer and constituting therewith a low resistance junction, an external work circuit interconnecting said point electrode and the main body of said block, and an annular control electrode insulated from and surrounding said point electrode, disposed to apply an electric field to said layer in the region of lateral current spread from said point electrode.

15. A circuit element which comprises a thin layer of semiconductive material, a point electrode in contact with one surface of said layer, a high impedance barrier in contact with a substantial area of the other surface of said layer, and a control electrode surrounding said point electrode in surface-field-producing relation to said layer within an area of radial current spread from said first electrode.

16. A circuit element which comprises a block of semiconductive material of which the main body is of one conductivity type while a thin surface layer, separated from the main body by a high resistance barrier, is of opposite conductivity type, a point electrode in contact with said surface layer and constituting therewith a low resistance junction, a plate electrode in contact with the body of the block and located on the opposite side of said barrier from said point electrode, an external work circuit including a potential source and a load interconnecting said point electrode and said plate electrode, said barrier serving to constrain current introduced into said block by way of said point electrode to spread laterally in said layer from said point electrode before crossing said barrier and to flow in the main body of the block in a direction substantially normal to the barrier, and a control electrode juxtaposed with said layer to apply, when supplied with control energy, an electric field to said layer in the region of said lateral current spread.

17. A circuit element which comprises a block of semiconductive material of which the main body is of one conductivity type while a thin surface layer, separated from the main body by a high resistance barrier, is of opposite conductivity type, a current input electrode making point contact with a surface of said layer, a current output electrode making low resistance contact with said body, said barrier serving to constrain current introduced into said layer by way of said input electrode to flow principally in lateral directions in said layer in the vicinity of said input electrode, and a control electrode juxtaposed with said layer in surface-field-producing relation therewith in an area of lateral current spread from said input electrode.

18. A translating device comprising a body of semiconductive material, one part of which is of one conductivity type and another part of which, separated from said one part by a high resistance barrier, is of opposite conductivity type, a first electrode making contact with said one body part over an area which is small compared with the extent of said one body part, a second electrode engaging said other body part, a work circuit connected between said two body parts, whereby said two body parts are connected in series from the standpoint of a current flowing in said work circuit, said barrier serving to constrain current intoduced into said body by way of said first electrode to spread in said first body part from said first electrode before crossing said barrier, and a control electrode juxtaposed with said first body part to apply, when supplied with control energy, an electric field to said first body part in the region of said current spread.

19. A translating device comprising a semiconductive body and a metal electrode making point contact with a face thereof, a circuit connected with said body and said electrode in series with a load and including a source of voltage for biasing said electrode to operate the semiconductive body in its reverse direction, and another electrode surrounding said point contact and insulated from said body for applying a control field to said body in the vicinity of said point contact.

JOHN BARDEEN.

REFERENCES CITED

The following references are of record in the file of this patent:

UNITED STATES PATENTS

| Number | Name | Date |
|---|---|---|
| 1,745,175 | Lilienfeld | Jan. 28, 1930 |
| 1,900,018 | Lilienfeld | Mar. 7, 1933 |
| 1,949,383 | Weber | Feb. 27, 1934 |
| 2,173,904 | Holst | Sept. 26, 1939 |
| 2,208,455 | Glaser | July 16, 1940 |
| 2,402,662 | Ohl | June 25, 1946 |
| 2,438,893 | Bieling | Apr. 6, 1948 |

FOREIGN PATENTS

| Number | Country | Date |
|---|---|---|
| 349,584 | Great Britain | May 26, 1931 |
| 439,457 | Great Britain | Dec. 6, 1935 |